METHOD OF ADDING SOLID MATERIAL TO MOLTEN METAL

Original Filed Feb. 25, 1957 3 Sheets-Sheet 1

INVENTORS
Rudolph Tietig, Jr.,
BY Daniel J. Pollingue, Jr.,
Byron Hume Green & Clement
Attys

METHOD OF ADDING SOLID MATERIAL TO MOLTEN METAL

Original Filed Feb. 25, 1957 3 Sheets-Sheet 2

INVENTORS
Rudolph Tietig, Jr.,
BY Daniel J Pollingue, Jr.,
Byron Hume Green & Clement
Attys

METHOD OF ADDING SOLID MATERIAL TO MOLTEN METAL

Original Filed Feb. 25, 1957 3 Sheets-Sheet 3

INVENTORS
Rudolph Tietig Jr.,
BY Daniel J. Pollingue, Jr.,
Byron Hume Green & Clement
Attys United States Patent Office Re. 26,751
Reissued Jan. 6, 1970

26,751

METHOD OF ADDING SOLID MATERIAL TO MOLTEN METAL

Rudolph Tietig, Jr., Oakland, Calif., and Daniel J. Pollingue, Jr., Oak Park, Ill., by A. J. Boynton and Co., Chicago, Ill., a corporation of Illinois, assignee Original No. 3,155,497, dated Nov. 3, 1964, Ser. No. 750,603, July 24, 1958, which is a division of application Ser. No. 642,291, Feb. 25, 1957, now Patent No. 2,872,180, dated Feb. 3, 1959, which in turn is a continuation-in-part of application Ser. No. 397,450, Dec. 10, 1953, now abandoned. Application for reissue Apr. 7, 1969, Ser. No. 846,983

Int. Cl. C22c *33/00*

U.S. Cl. 75—129 2 Claims

Matter enclosed in heavy brackets [ ] appears in the original patent but forms no part of this reissue specification; matter printed in italics indicates the additions made by reissue.

*ABSTRACT OF THE DISCLOSURE*

*The method of adding predetermined quantities of a solid material to a ladle of molten metal at a controlled rate wherein the addition of such materials may be made continuous and controlled as to amount in accordance with the rate of flow of the molten metal into the ladle.*

*This application is a division of our copending application Ser. No. 642,291 filed Feb. 25, 1957, now Patent No. 2,872,180 granted Feb. 3, 1959, and entitled Apparatus for Adding Solid Material to Molten Metal, and wherein said copending application was a continuation-in-part of a parent application on the same invention Ser. No. 397,450 filed Dec. 10, 1953, and entitled Method and Apparatus for Adding Solid Material to Molten Metal, now abandoned.*

The invention relates to a new and improved method for adding predetermined quantities of solid material to a ladle of molten metal at a controlled rate. More particularly, it relates to such a method adapted for use in cooperation with the tapping ladles for open hearth furnaces coincidentally with the flow of molten metal from the furnace to the ladle.

In the manufacture of steel, it is customary to add certain additional materials such, for example, as alloys of manganese, and the steel is made to quite specific requirements as to the percentages of such additional materials. The specification of such additional materials requires that they be uniformly distributed throughout a heat which may comprise many tons of metal. Such additions are also often quite costly and any method of adding the materials must avoid waste of the materials if the method is to be of practical commercial importance.

Additions have heretofore been made both in the furnace and in the ladle. Both methods have resulted in substantial losses of valuable alloying materials in the slag. Additions to the ladle have comprised the manual shoveling of the material into the ladle or throwing of the material into the ladle in bags. Both such methods result in somewhat irregular additions and results. When material is added in unregulated quantities and in relatively large amounts at spaced time intervals with large quantities entering the ladle in a short period of time, alloying materials are lost and non-uniform steel results. For example, some of the material may float on top of the molten steel and be lost in the slag. Also, there may be localized freezing of the molten metal with non-uniform distribution of the alloying materials. When the material is added in the furnace there are substantial losses in the slag.

It is an object of the present invention to provide a new and improved method for supplying solid materials to molten metal.

It is a further object to provide a method whereby the addition of such materials may be made continuous and controlled as to amount in accordance with the rate of flow of steel into the ladle.

A still further object of the invention is to provide a method of adding alloying materials in discrete form and at a variable rate to molten metal as it is discharged from a furnace into a ladle and wherein the rate of feed can be so regulated that each increment of liquid flow is brought into contact with a desired and predetermined quantity of alloying material.

Other and further objects will appear as the description proceeds.

We have shown certain preferred embodiments of apparatus for carrying out our invention in the accompanying drawings, in which—

Figure 1:
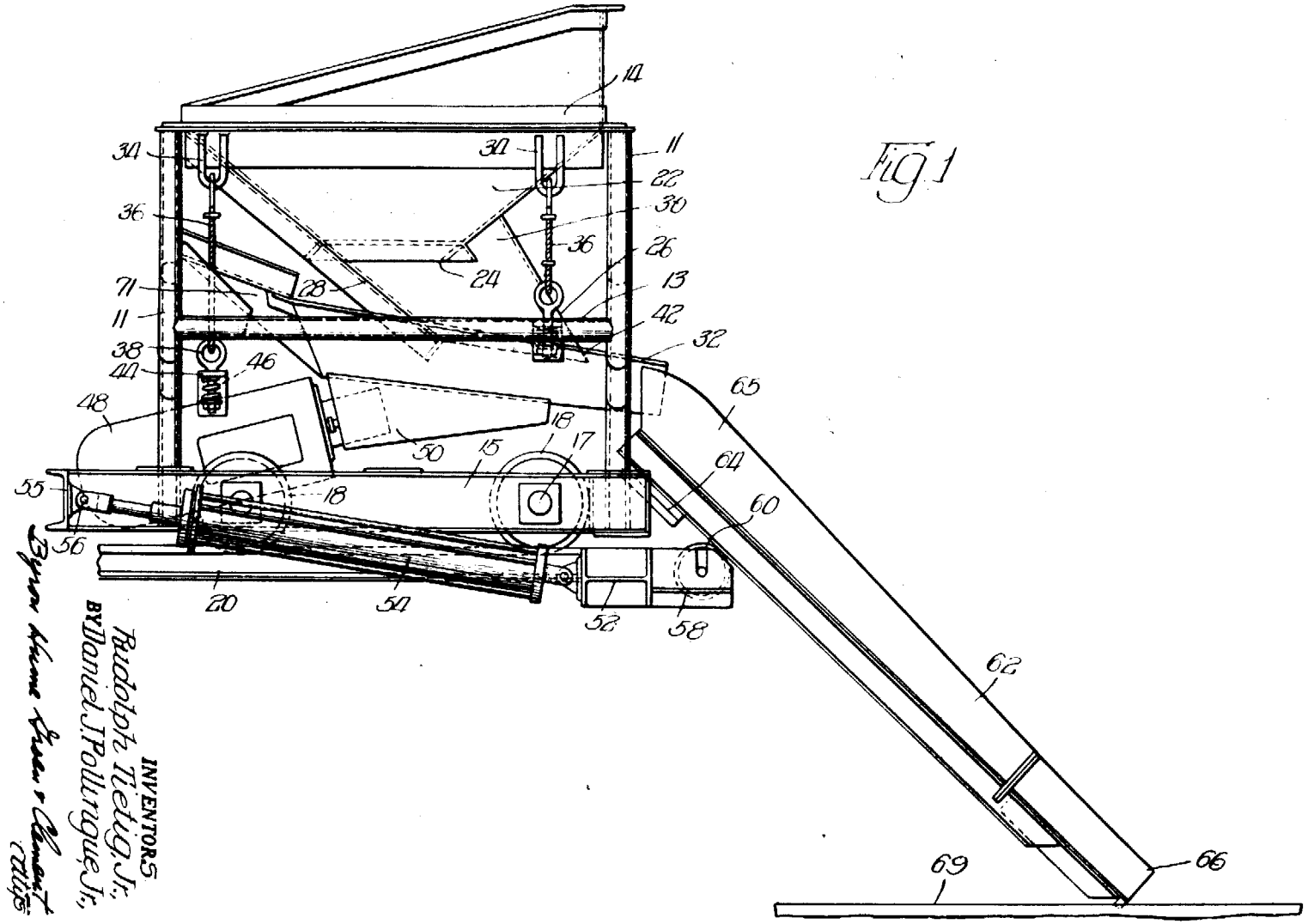
FIGURE 1 is a side elevation of the apparatus.

The apparatus comprises a frame having vertical members 11, horizontal bracing members 13, and upper horizontal members 14, the frame being supported on a base 15. This base 15 is provided with stub shafts 17 carrying rollers 18. These rollers ride on the spaced parallel rails 20, which may be supported on any suitable structure, not shown. The upper members 14 of the frame support the hopper 22, having a central bottom opening 24. A material guide chute 26 is provided with a sloping rear member 28 and lateral members 30 to direct material from the hopper 22 on to the vibrating feeder pan 32.

This feeder pan 32 is supported from the frame by means of the U-shaped members 34, suspension rods 36, and support eyes 38, which extend through the front ears 42 and the rear ears 44. The suspension is cushioned by springs 46. The front ears 42 are secured to the feeder pan 32, while the rear ears 44 are secured to the vibrating mechanism 48 which is connected to the underside of the pan 32 by the bracket assembly 50.

Figure 2:
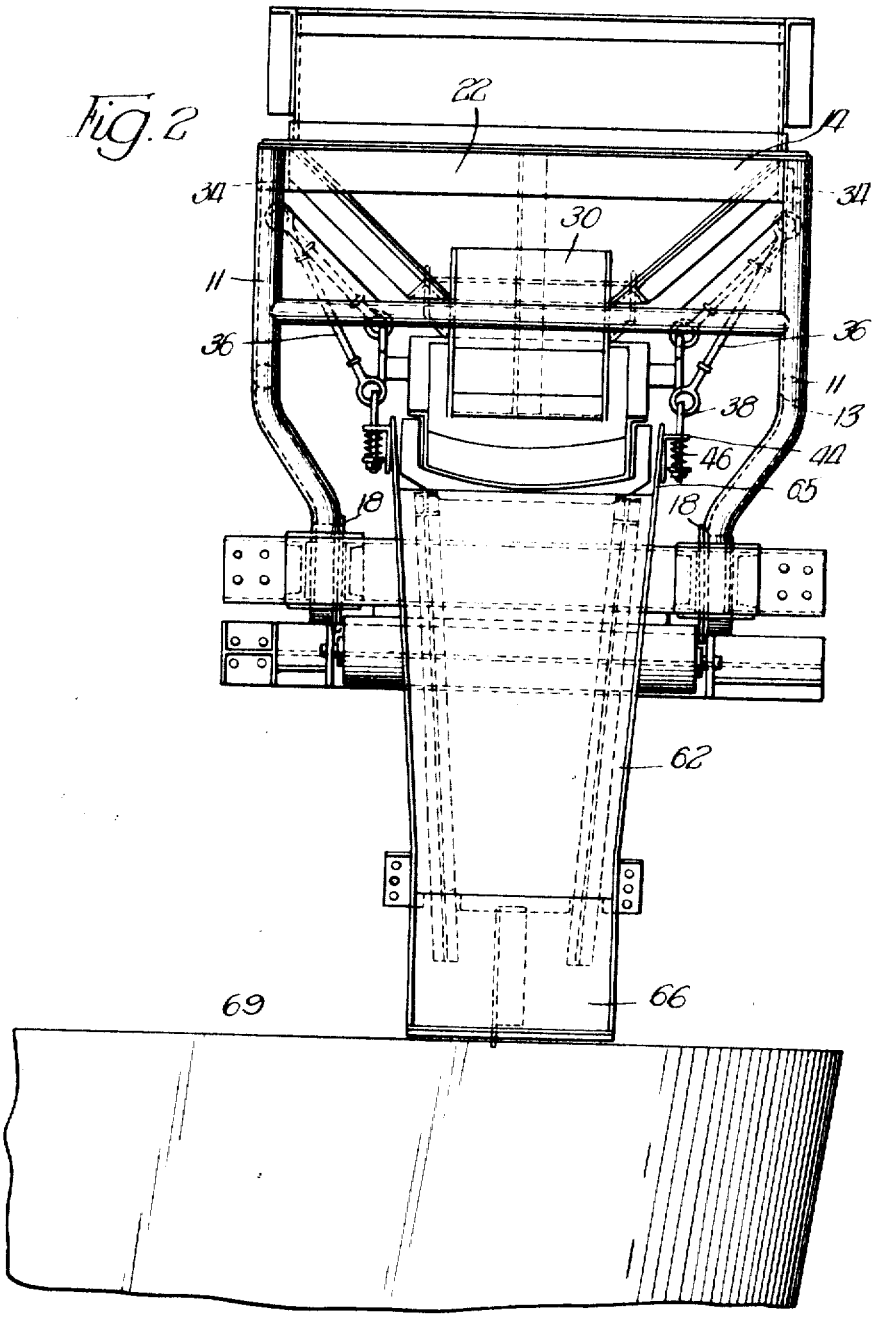
FIGURE 2 is an end view of the apparatus as seen from the right of FIGURE 1.

The cross member 52 is welded or otherwise secured to the supports for the rails 20 below the forward end of these rails. This cross member 52 is connected by air actuated cylinders 54 to the rear cross member 55 of the bottom frame support 15, as shown at 56. The arms 58 extend forwardly from the cross frame members 52 and carry the roller 60 which extends transversely of the frame. The discharge chute 62 is pivotally supported by brackets 64 from the forward ends of the frame member 15. An adjustment may be provided in this pivoted connection so that the chute may be moved laterally to the correct horizontal positioning relative to the furnace spout. Once established, this adjustment need not be changed. As shown in FIGURE 2, this chute 62 tapers from its upper end 65, which is located below the discharge end of the vibrating pan 32, to its lower end 66, which is located above the metal holding ladle 69. Supplementary additions may be made while feeding from the hopper 22, by means of the secondary chute 71, which feeds directly to the feeder pan 32.

In operation of the apparatus, the hopper and its supporting frame are moved backwardly and forwardly on rollers 18 which roll on track 20 by means of the air actuated, remotely controlled, cylinders 54. Admitting air into the right end of these cylinders moves the frame and the entire assembly supported thereby to the left, as seen in FIGURE 1. The roller 60, supporting the chute 62, is fixed in relation to the track 20 so that as the assembly is moved to the left, the chute 62 pivots about its supporting brackets 64 and its outer or discharge end is raised as well as being moved to the left to clear the ladle 69. The exact inclination of the chute 62 and its position relative to the ladle may be varied by control of the air cylinders 54.

The material to be added to the ladle is placed in the hopper 22 and said hopper may be of a size to contain a measured quantity of said material, or indicia could be provided on the side wall of the hopper such that the operator may accurately ascertain the quantity when the hopper is not completely full. The material must be granular in form and should not have lumps exceeding about two and one-half inches in diameter. It will be understood that said material will pass down through the hopper opening 24 so that the lower portion of the pile of contained material will rest on the vibrating feeder pan 32. Of course, the material is restrained against lateral and rearward movement by the walls 28 and 30, and its angle of repose will be such that the material resting on pan 32 will not flow over the discharge end of the pan. When it is desired to discharge the material, the vibrator 48 is placed in operation and the vibration of the inclined pan 32 will cause a flow of material to take place over the discharge end of the pan and into the chute 62 where it will flow by gravity to discharge from the lower end 66 of the chute into the ladle 69.

The inclined pan 32 may be considered as forming the bottom of the hopper and said pan is given any desired form of vibrating or reciprocating movement such as will produce a discharge of the discrete materials into the chute 62 and wherein said discharge can be regulated by regulation of the vibrating or reciprocating movement. The vibrating mechanism 48 is preferably of the electrical type with variation in rate of feed being attained by voltage control of the power current supplied to the mechanism. Accordingly rate of feed can conveniently be adjusted manually by turning a small hand wheel on a control panel. Also it is desirable to have said rate of feed variable over a wide range. For example, the vibrating mechanism 48 should be capable of regulation so as to add ten thousand (10,000) pounds of material such as manganese in three minutes or three thousand (3,000) pounds in twenty minutes or even longer.

Figure 3:
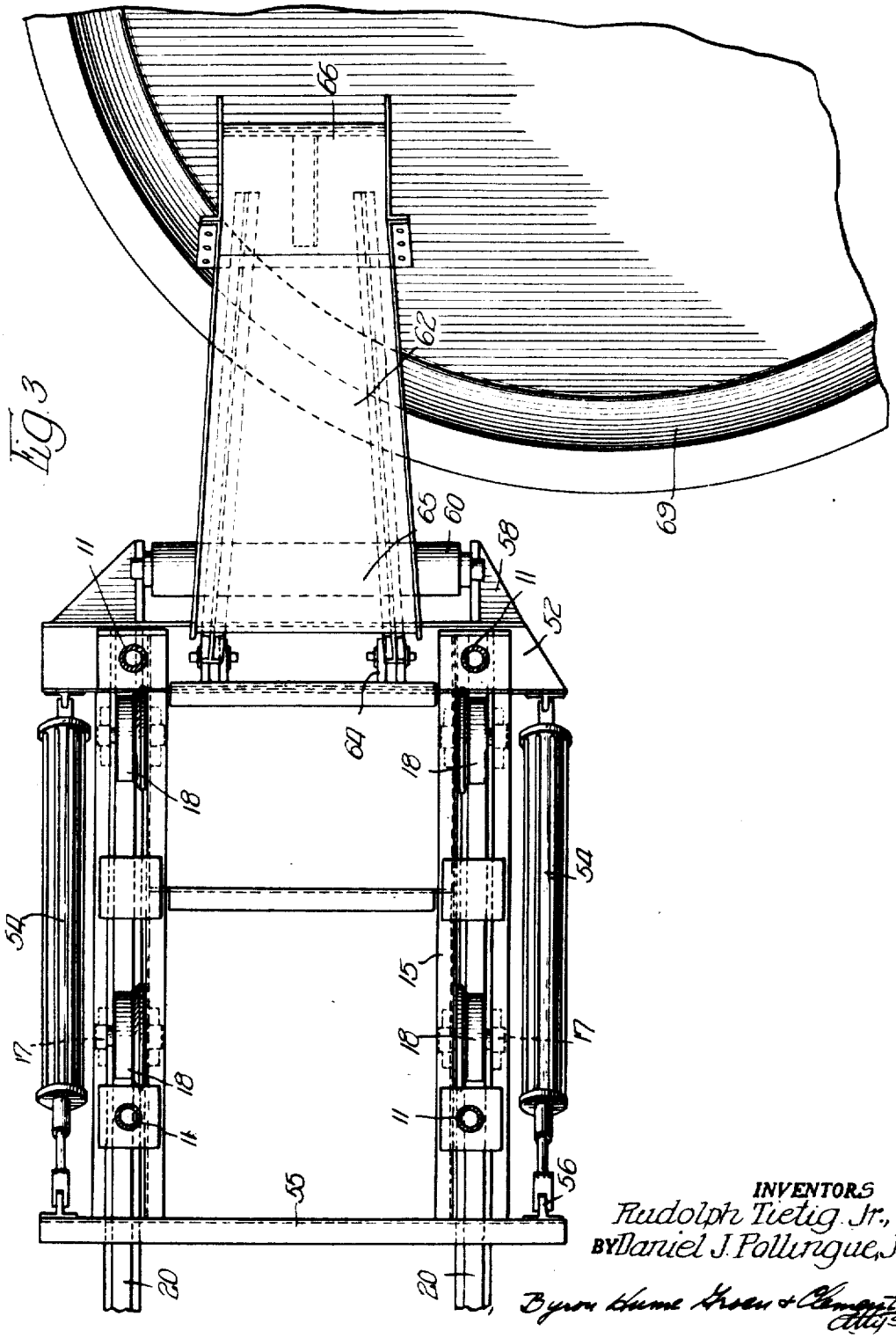
FIGURE 3 is a plan view of the apparatus with the hopper removed to show the lower construction.

The discharge end 66 of the chute should be located close to the stream of metal leaving the tapping spout of the furnace and entering the ladle. Thus the material falling from the chute will meet the molten steel in the ladle at the same point as the steel falling from the tapping spout meets the body of molten steel. This will result in a better mixing of the solid material being added to the molten metal than if the material were introduced at other points in the ladle. The center line of the tapping spout, as clearly shown in FIGURE 3, is not located along the center line of the ladle. The ladle is either circular or oval and therefore the tangential introduction of the molten steel into the ladle causes a swirling motion of the steel in the ladle, the solid material being added at a point of introduction of the steel flow into the swirl. This swirling movement gives a very effective mixing of the material with the molten metal. The exact horizontal position of the chute will be determined by the operator by means of the air cylinder 54, and once established, it does not require to be changed during the discharge of material.

After the apparatus is in position for adding materials to the ladle and a small quantity of the steel has fallen into the ladle, the vibrating mechanism 48 is started by remote control. The rate of vibration and correspondingly, the rate of flow of material is remotely controlled and adjusted to correspond with the rate of flow of the molten steel from the furnace. All additions should be completed and the feeder vibrator 48 stopped by the time the ladle is about eighty percent full. This will allow time to retract the apparatus from the ladle so as to prevent the discharge end 56 of the chute from being damaged by molten steel or slag in the ladle. It also allows the last of the material fed into the ladle to be thoroughly mixed by the continued swirling action of the last metal introduced into the ladle.

The method and apparatus of the present invention have numerous advantages, both direct and indirect, over prior methods and apparatus for making open hearth steel ladle additions.

The rate of adding the solid materials to the ladle can be varied to correspond to the rate of flow out of the furnace. Not only is the solid material added to the molten steel in the ladle simultaneously, gradually and continuously, but also at a regulated rate in accordance with the rate of flow of steel into the ladle so that each increment of molten steel is brought into intimate contact with exactly the desired amount of solid addition. If the rate of addition is not regulated, then a large quantity of material entering in a short period of time may result in some of the material floating on top of the molten steel and being lost in the slag, or there may be localized freezing of the molten metal. The possibilities of materials floating or of localized freezing are greatly reduced if the solid materials are added over a considerable part of the time that molten steel is flowing into the ladle. Another important advantage is being able to make larger additions to the ladle. As a result, larger recovery of certain materials, principally the alloys of manganese, will be obtained in the steel if those materials are added to the steel in the ladle rather than to steel in the open hearth furnace. For example, it has been ascertained that the recovery of manganese when added to the ladle is about ten percent greater than when added to the furance. Another important advantage is that a narrower manganese specification is possible. In other words, manganese additions can be calculated about 0.05 points lower than if some or all are added to the furnace.

[This application is a divisional of our copending application Serial No. 642,291, filed February 25, 1957, now Patent No. 2,872,180, granted February 3, 1959, and entitled Apparatus for Adding Solid Material to Molten Metal.]

While we have shown and described certain preferred methods for carrying out our invention, these are to be understood to be illustrative only as they are capable of variation to meet differing conditions or requirements. We therefore contemplate such modifications as come within the spirit and scope of the appended claims.

What is claimed is:

1. The method of adding solid alloying material in discrete form to molten steel for alloying purposes, the steps which include tapping a steel furnace into a ladle, supporting the alloying material above the ladle by means of a vibratory pan, discharging the alloying material from said pan into the ladle during the tapping operation by vibrating said pan, and regulating the discharging rate for said alloying material by varying the vibratory motion of the pan so as to proportion the discharge of the alloying material to the rate of flow of molten steel into the ladle.

2. The method of adding solid material in discrete form to molten steel as defined by claim 1, wherein the step of tapping the steel furnace is conducted in a manner to cause a swirling motion of the metal in the ladle, and wherein the alloying material is discharged into the ladle at a point adjacent the entry of the molten steel into the ladle.

References Cited

The following references, cited by the Examiner, are of record in the patented file of this patent or the original patent.

UNITED STATES PATENTS

| | | | |
|---|---|---|---|
| 813,278 | 2/1906 | Canda | 75—129 |
| 1,318,164 | 10/1919 | McConnell | 75—46 |
| 1,646,728 | 10/1927 | Evans | 75—55 |
| 2,539,070 | 1/1951 | Gebo | 198—59 X |
| 2,698,784 | 1/1955 | Timmins | 75—54 X |

L. DEWAYNE RUTLEDGE, Primary Examiner

J. E. LEGRU, Assistant Examiner